United States Patent Office 3,496,160
Patented Feb. 17, 1970

3,496,160
MONOAZO DYESTUFFS CONTAINING A DIHALOPHYRIDAZONE GROUP
Masao Iizuka, Yokohama, Norio Igari, Tokyo, and Shinya Ito, Kyoto, Japan, assignors to Hodagaya Kagaku Kogyo Kabushiki Kaisha, Minoto-ku, Tokyo, Japan
No Drawing. Filed July 14, 1966, Ser. No. 565,079
Int. Cl. C09b 29/26, 29/12; C08k 1/74
U.S. Cl. 260—154                                    7 Claims

ABSTRACT OF THE DISCLOSURE

Water-insoluble or sparingly soluble monoazo dyestuffs represented by the formula:

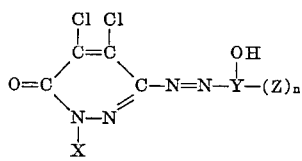

wherein X is lower alkyl, Y is a benzene or naphthalene residue having the hydroxyl group ortho- to the azo linkage, Z is hydrogen, chlorine, bromine, lower alkyl, lower alkoxy, mono- or di-lower alkylamino, phenylamino, methyl- or ethyl-phenylamino and $n$ is 1 or 2.

These monoazo dyestuffs are particularly suitable for dyeing of metal-containing hydrophobic organic substances such as metal-containing polyolefines and polyesters in deep shade of coloration and have excellent fastness to light, washing, heat, dry cleaning, gas and sublimation.

---

The present invention relates to the new water-insoluble or sparingly soluble monoazo dyestuffs suitable for dyeing metal-containing, hydrophobic organic substances.

It is known that the hydrophobic, high molecular organic substances such as, for example, polyolefines derived from alpha-olefine having two or three carbon atoms, that is, ethylene and propylene as well as polyesters derived from ethylene glycol and terephthalic acid originally possess many beneficial physical properties. Nevertheless, owing to their chemical inertness and hydrophobic character, these substances are lacking in an affinity toward dyetuffs commonly employed in the conventional dyeing processes. For this reason, the deep dyeing on these substances cannot be obtained with the known dyestuffs. Dyeing of medium shade on these substances might be obtained with the conventional dyestuffs, but would not have a satisfactory fastness to light, washing, sublimation, organic solvents and the like.

Many methods involving chemical and physical procedures have been proposed in order to improve dye-acceptability of these substances. One of which is introducing a dyeable site in the substances by halogenation or chlorosulfonation. Another method is introducing a polymeric side chain containing a functional group or groups into the substances by grafting. Still another method is a blending of said substances with a dyeable polymer which is compatible with the former.

Still another method which has also been proposed and which is particularly notable as the method for imparting dyeability to the substances is an incorporation of an amount of certain inorganic or organic compound of metals such as, for example, nickel, chromium, cobalt, zinc, copper, aluminum and the like into said difficult-dyeing substances. All of these metals belong to the group of transition metals in the Periodic System of the Elements and are capable of forming the so-called "Werner complex." These metal compounds may be incorporated into the substances in a form of an organic complex salt or a simple salt of a fatty acid. The metallic compounds are also effective to stabilize the substances against the undesirable degradation which may be caused by light and/or or heat.

We have now found and herein provide the novel water-insoluble or sparingly soluble monoazo dyestuffs which are suitable for dyeing metal-containing polyolefines and polyesters in a deep shade having an excellent fastness property.

The novel, water-insoluble or sparingly soluble monoazo dyestuffs according to the present invention are represented by the formula:

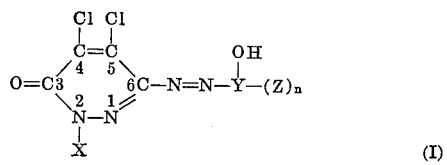

wherein X is lower alkyl, Y is a benzene or naphthalene residue having the hydroxyl group ortho to the azo-linkage, Z is hydrogen, chlorine, bromine, lower alkyl, lower alkoxy, mono- or di-lower alkylamino, phenylamino, methylphenyl- or ethylphenylamino and $n$ is 1 or 2.

The monoazo dyestuff represented by the Formula I according to the present invention may be prepared by coupling a diazotized 2-substituted-4,5-dichloro-6-aminopyridazone-(3) represented by the formula:

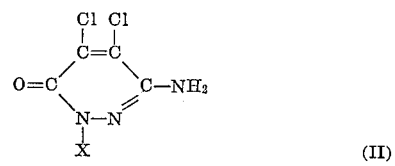

wherein X is as defined above with an azo component having the formula:

wherein Y, Z and $n$ are as defined above. The diazotization of the compound (II) may be carried out according to the conventional manner.

The 2-substituted 4,5-dichloro-6-aminopyridazone-(3) represented by the Formula II includes 2-methyl-, 2-ethyl-, 2-propyl- and 2-butyl-substituted derivatives thereof.

The azo component represented by the Formula III includes 2-naphthol, 6-bromo-2-naphthol, 4-methoxy-1-naphthol, 4-ethoxy-1-naphthol, 3-dimethylaminophenol, 3-diethylaminophenol, 3-di-n-propylaminophenol, 3-di-n-butylaminophenol, 3-methylaminophenol, 3-ethylaminophenol, 3-n-propylaminophenol, 3-n-butylaminophenol, 3-hydroxy-diphenylamine, 3-hydroxy-N-methyldiphenylamine, 3-hydroxy-N-ethyldiphenylamine, p-cresol, 2,4-xylenol, 3,4-xylenol, resorcinol monomethylether, hydroquinone monomethylether, 4-chlorophenol and the like.

The coupling reaction for the formation of the contemplated monoazo dyestuffs according to the present invention may be conducted by a conventional alkaline coupling method or a method which is carried out in a lower aliphatic acid, preferably in glacial acetic or propionic acid or a mixture thereof and advantageously by buffering the acidity of the reaction medium by the aid of an alkali salt such as, for example, alkali carbonate or an alkali salt of lower fatty acid.

The novel monoazo dyestuffs according to the present invention are employed in a finely divided form prepared for example, by milling the same with a dispersing agent. As suitable dispersing agent, there may be mentioned dispersing agents which belong to the anionic system such as, for example, alkylaryl sulfonate, lignium sulfonate, a condensation product of naphthalene sulfonic acid and formaldehyde as well as nonionic dispersing agents such as polyglycol ether of an aliphatic alcohol.

The monoazo dyestuffs of the present invention are characterized by the fact that they have an outstanding affinity toward the aforementioned hydrophobic organic substances containing one of the above-enumerated metals, and accordingly they can produce a deep shade on these substances. The dyeing thus obtained shows an extreme fastness property to light, washing, heat, dry-cleaning, gases, sublimation and the like.

The following examples are illustrative of the invention and are not to be considered as limiting; parts being by weight.

EXAMPLE 1

1.94 parts of 2-methyl-4,5-dichloro-6-aminopyridazone-(3) were dissolved in 30 parts of 60% acetic acid. To the solution was added 1 part of 98% sulfuric acid and the whole was cooled to the temperature ranging from 0° C. to —5° C. Diazotization of the solution was then carried out at that temperature by adding drop by drop 16.2 parts of nitrosyl sulfuric acid containing 0.73 part of sodium nitrite. The reaction mixture was kept for 2 hours during which an excessive amount of nitrous acid was presented which may be detected by means of a tint paper of starch-potassium iodide. At the end of this time, a small amount of urea was added in order to decompose the unreacted nitrous acid.

A second solution was prepared by dissolving 1.73 parts of 3-diethylaminophenol by the aid of 0.42 part of caustic soda in 100 parts of water. To the solution were added 81.5 parts of a 30% aqueous caustic soda solution and the whole was cooled.

Coupling was effected by adding slowly the first solution which was cooled and contains the diazo compound to the second solution. During the addition, the reaction mixture was kept to the temperature of 0° C. to —5° C. After stirring for one hour at that temperature, an amount of acetic acid was added to the reaction mixture to adjust the pH value to 5–6, and was filtered off. The filter cake was exhaustively washed with water and then dried in the oven at the temperature of 70° C. There were thus obtained 2.92 parts of a reddish brown dyestuff having the formula:

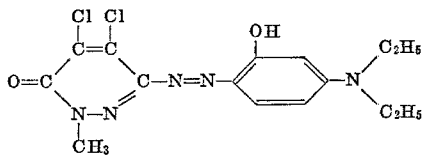

Nickel-containing propylene yarns were dyed with a dye bath prepared by dispersing the above dyestuff which had been milled by the aid of Tamol-N. There was obtained a brilliant and deep dyeing of a violet shade having an excellent fastness to washing, dry-cleaning and light.

The 2-methyl-4,5-dichloro-6-aminopyridazone-(3) used in the instant example was prepared as follows:

(a) Preparation of 4,5-dichloropyridazone-(3)

The compound was prepared according to the procedure of David T. Mowry, J. Am. Chem. Soc., 75, 1910 (1953) and T. Kuraishi, Chem. Pharm. Bull. (Tokyo), 4, 498 (1956) (Eng.). The compound had the melting point of 199°–200° C.

(b) Preparation of 2-methyl-4,5-dichloropyridazone-(3)

16.5 parts of 4,5-dichloropyridazone-(3) were dissolved in an aqueous solution containing 80 parts of methanol, 4.4 parts of caustic soda and 80 parts of water. To the solution were added drop by drop under ice-cooling 13.9 parts of dimethyl sulfate with agitation. The reaction mixture was maintained at the temperature below 20° C. and stirred for further one hour to secure the performance of reaction. Crystalline mass, which separated out when the reaction mixture was concentrated under reduced pressure, was collected by filtration, washed with water and dried. There were obtained 16.2 parts of 2-methyl-4,5-dichloropyridazone-(3) melting at 84°–86° C.

(c) Preparation of 2-methyl-4,5-dichloro-6-nitropyridazone-(3)

17.9 parts of 2-methyl-4,5-dichloropyridazone-(3) were dissolved in a mixture of 90 parts of oleum containing 30% by weight of free $SO_3$ and 36 parts of 98% sulfuric acid and the mixture was cooled. To the cooled solution were added portion-wise 25.3 parts of potassium nitrite, and the whole was heated with stirring to the temperature of 90°–100° C.

The reaction was performed by maintaining the whole at that temperature for 10 hours. After cooling, the reaction mixture was poured onto 2,000 parts of ice-water. The crystalline mass which separated out was collected by filtration, washed with water and dried. There were obtained 19.2 parts of yellow crystals of 2-methyl-4,5-dichloro-6-nitropyridazone-(3) melting at 97°–99° C.

(d) Preparation of 2-methyl-4,5-dichloro-6-aminopyridazone-(3)

To a mixture of 120 parts of water and 120 parts of ethanol were introduced 38.8 parts of powdered reduced iron and 2.5 parts of 36% hydrochloric acid, and the mixture was heated to 78°–82° C. To the mixture were added 15.5 parts of the 2-methyl-4,5-dichloro-6-nitropyridazone-(3) for half an hour. After stirring at the temperature of 78°–82° C. for an hour, the reaction mixture was made alkaline by adding sodium carbonate at 70° C. and filtered while hot. The filtrate was neutralized with addition of glacial acetic acid, and the alcohol contained therein was recovered by distillation.

The remaining solution was cooled to crystallize out the product which was then filtered, washed with water and dried. There were obtained 12.5 parts of white crystals of 2-methyl-4,5-dichloro-6-aminopyridazone-(3) having the melting point of 191.5°–193° C.

EXAMPLE 2

2.08 parts of 2-ethyl-4,5-dichloro-6-amino-pyridazone-(3) were dissolved in 30 parts of 80% acetic acid. To the solution was added 1 part of 98% sulfuric acid and cooled to 0° C. to —5° C. At this temperature, 16.2 parts of a nitrosyl sulfuric acid containing 0.73 part of sodium nitrite were added drop by drop to cause diazotization. An excessive amount of the nitrous acid which may be detected by means of a piece of potassium iodide-starch tint-paper, was maintained in the solution for one hour in order to secure the diazotization reaction. The nitrous acid was then decomposed with addition of a small amount of sulfamic acid.

Another solution was prepared by dissolving 1.51 parts of β-naphthol in an aqueous solution which consists of 0.42 part of caustic soda and 100 parts of water, followed by addition of 81.5 parts of 3.0% caustic soda solution and the whole was then cooled.

To the solution was added at the temperature ranging from 0° C. to —5° C. the preceding diazotized solution. After stirring one hour at that temperature, the pH value of the solution was brought to 5–6 with addition of acetic acid. The reaction product which separated out was collected by filtration, washed well with water and dried at 70° C. 3.32 parts of a reddish brown dyestuff represented by the following formula were obtained.

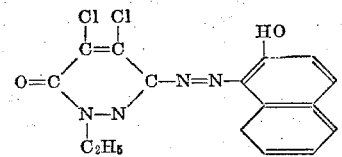

Fibrous material of nickel-containing polypropylene was dyed with a dye-bath prepared by dispersing the above mentioned monoazo dyestuff which had been subdivided by milling with Tamo-N. The fiber was colored a deep blue shade which was characterized by the fastness to washing, dry-cleaning, sublimation, gases and light.

In similar manner, a cobalt-containing polypropylene fiber was dyed a dark greenish blue shade and a zinc-containing polypropylene fiber was dyed a brilliant blue shade. Both of these dyeings possessed a remarkable fastness property.

2-ethyl-4,5-dichloro-6-amino-pyridazone-(3) employed in the instant example was prepared in accordance with the steps similar to those mentioned in the preceding example as follows:

4,5-dichloro-pyridazone-(3) was first converted into 2-ethyl-4,5-dichloro-pyridazone-(3) by reacting the former with an equivalent amount of diethyl sulfate instead of the dimethyl sulfate. The compound thus obtained had the melting point of 47°–50° C.

The 2-ethyl-4,5-dichloropyridazone-(3) was nitrated to form 2-ethyl-4,5-dichloro-6-nitro-pyridazone-(3) having the melting point of 87°–89.5° C. which was then subjected to reduction to form the white crystals of 2-ethyl-4,5-dichloro-6-amino-pyridazone-(3) having the melting point of 130°–131.5° C.

In analogous manner as mentioned in the preceding examples, there were obtained a series of dyestuffs having the outstanding fastness, which are tabulated in table:

TABLE

| Ex. | Diazo component: 4,5-dichloro-6-aminopyridazone-(3) substituted with group listed | Azo component | Appearance | Shade on nickel containing polypropylene fiber |
|---|---|---|---|---|
| 3 | 2-methyl- | 2-naphthol | Reddish orange | Blue. |
| 4 | do | 6-bromo-2-naphthol | do | Do. |
| 5 | do | 4-methyl-1-naphthol | Reddish violet | Do. |
| 6 | do | 4-methoxy-1-naphthol | do | Brilliant blue. |
| 7 | do | 4-cresol | Brown | Green. |
| 8 | do | 4-methoxy phenol | do | Do. |
| 9 | do | 3-methoxyphenol | do | Violet. |
| 10 | do | 3,4-dimethylphenol | do | Green. |
| 11 | do | 2,4-dimethylphenol | do | Do. |
| 12 | do | 4-chlorophenol | do | Do. |
| 13 | do | 3-dimethylaminophenol | Reddish brown | Violet. |
| 14 | do | 3-methylaminophenol | do | Do. |
| 15 | do | 3-ethylaminophenol | do | Do. |
| 16 | do | 3-di-n-propylaminophenol | do | Do. |
| 17 | do | 3-di-n-butylaminophenol | do | Do. |
| 18 | do | 3-hydroxydiphenylamine | do | Blueish violet. |
| 19 | do | 3-hydroxy-N-methyldiphenylamine | do | Do. |
| 20 | do | 3-hydroxy-N-ethyldiphenylamine | do | Do. |
| 21 | 2-ethyl- | 6-bromo-2-naphthol | Reddish orange | Blue. |
| 22 | do | 4-methyl-1-naphthol | Reddish violet | Do. |
| 23 | do | 4-methoxy-1-naphthol | do | Brilliant blue. |
| 24 | do | 4-ethoxy-1-naphthol | do | Do. |
| 25 | do | 4-cresol | Brown | Green. |
| 26 | do | 4-methoxyphenol | do | Do. |
| 27 | do | 3,4-dimethylphenol | do | Do. |
| 28 | do | 2,4-dimethylphenol | do | Do. |
| 29 | do | 4-methyl-2-chlorophenol | do | Do. |
| 30 | do | 4-chlorophenol | do | Do. |
| 31 | do | 3-dimethylaminophenol | Reddish brown | Violet. |
| 32 | do | 3-N-methylaminophenol | do | Do. |
| 33 | do | 3-diethylaminophenol | do | Do. |
| 34 | do | 3-N-ethylaminophenol | do | Do. |
| 35 | do | 3-di-n-propylaminophenol | do | Do. |
| 36 | do | 3-di-n-butylaminophenol | do | Do. |
| 37 | do | 3-hydroxydiphenylamine | do | Blueish violet. |
| 38 | do | 3-hydroxy-N-ethyldiphenylamine | do | Do. |
| 39 | do | 3-hydroxy-N-methyldiphenylamine | do | Do. |
| 40 | 2-n-propyl- | 2-naphthol | Orange | Blue. |
| 41 | do | 6-bromo-2-naphthol | Reddish orange | Do. |
| 42 | do | 4-methyl-1-naphthol | Blueish violet | Do. |
| 43 | do | 4-methoxy-1-naphthol | do | Do. |
| 44 | do | 4-cresol | Brown | Green. |
| 45 | do | 4-methoxy phenol | do | Do. |
| 46 | do | 3-dimethylaminophenol | Reddish brown | Violet. |
| 47 | do | 3-di-n-butylaminophenol | do | Do. |
| 48 | do | 3-hydroxy-N-methyldiphenylamine | do | Do. |
| 49 | 2-n-butyl- | 2-naphthol | Brown | Blue. |
| 50 | do | 4-methoxy-1-naphthol | Blueish brown | Do. |
| 51 | do | 4-cresol | Brown | Green. |
| 52 | do | 4-methoxyphenol | do | Do. |
| 53 | do | 3-dimethylaminophenol | Reddish brown | Violet. |
| 54 | do | 3-di-n-butylaminophenol | do | Do. |

What is claimed is:
1. Monoazo dyestuff of the formula:

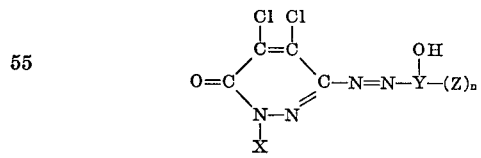

wherein X is lower alky; Y is a benzene or naphthalene residue having the hydroxyl group ortho- to the azo-linkage; Z is hydrogen, chlorine, bromine, lower alkyl, lower alkoxy, mon- lower-alkylamino, di-lower-alkylamino, phenylamino, methyl-phenylamino or ethyl-phenylamino; and n is 1 or 2.

2. Monoazo dyestuffs according to claim 1 wherein X is methyl, ethyl, propyl or butyl.

3. Monoazo dyestuffs of the formula:

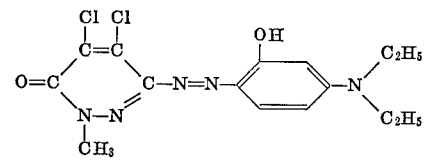

4. Monazo dyestuff of the formula:
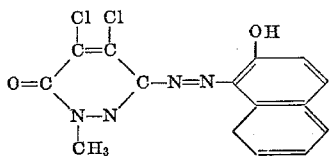
5. Monoazo dyestuff of the formula:
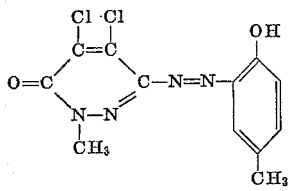
6. Monoazo dyestuff of the formula:
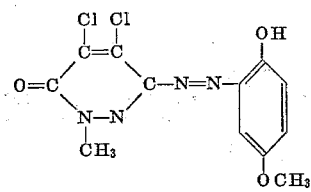
7. Monoazo dyestuff of the formula:
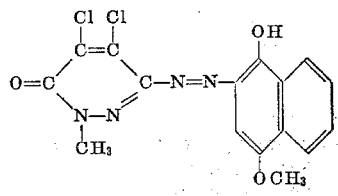
References Cited
UNITED STATES PATENTS
| | | | |
|---|---|---|---|
| 3,108,103 | 10/1963 | Hensel et al. | 260—154 XR |
| 3,126,369 | 3/1964 | Hensel et al. | 260—154 |
| 3,126,370 | 3/1964 | Hensel et al. | 260—154 |
| 3,232,926 | 2/1966 | Randall et al. | 260—154 |
| 3,256,275 | 6/1966 | Tartter et al. | 260—154 XR |
| 3,256,282 | 6/1966 | Reicheneder et al. | 260—154 XR |
| 3,341,512 | 9/1967 | Wegmuller et al. | 260—154 |
| 3,352,846 | 11/1967 | Luetzel | 260—154 |
| 3,374,220 | 3/1968 | Kremer et al. | 260—154 |
FLOYD D. HIGEL, Primary Examiner
U.S. Cl. X.R.
8—44; 260—250